US012513106B2

(12) United States Patent
Traynor et al.

(10) Patent No.: US 12,513,106 B2
(45) Date of Patent: Dec. 30, 2025

(54) BI-DIRECTIONAL CBRS COMMUNICATIONS SYSTEM AND METHODS

(71) Applicant: Universal City Studios LLC, Universal City, CA (US)

(72) Inventors: Mark James Traynor, Orlando, FL (US); Robert Michael Jordan, Orlando, FL (US); Sean Fitzpatrick, Winter Garden, FL (US); Thomas Owen Williams, Orlando, FL (US); Patrick John Goergen, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 451 days.

(21) Appl. No.: 18/086,242

(22) Filed: Dec. 21, 2022

(65) Prior Publication Data
US 2023/0198936 A1 Jun. 22, 2023

Related U.S. Application Data

(60) Provisional application No. 63/292,718, filed on Dec. 22, 2021.

(51) Int. Cl.
H04L 61/256 (2022.01)
H04L 43/10 (2022.01)
H04W 40/24 (2009.01)

(52) U.S. Cl.
CPC ............ H04L 61/256 (2013.01); H04L 43/10 (2013.01); H04W 40/24 (2013.01)

(58) Field of Classification Search
CPC ....... H04L 61/256; H04L 43/10; H04W 40/24
See application file for complete search history.

(56) References Cited

U.S. PATENT DOCUMENTS

| 8,909,224 | B2 | 12/2014 | Haynes et al. |
| 10,204,191 | B2 | 2/2019 | Asenjo et al. |
| 10,524,183 | B2* | 12/2019 | Abdallah ............. H04B 7/0617 |
| 10,984,677 | B2 | 4/2021 | Asenjo et al. |
| 2005/0085928 | A1* | 4/2005 | Shani ................... G05B 19/056 700/20 |
| 2016/0179993 | A1 | 6/2016 | Maturana |
| 2019/0104044 | A1* | 4/2019 | Yang ................... H04L 41/0604 |

(Continued)

FOREIGN PATENT DOCUMENTS

| CN | 105159109 A | 12/2015 |
| EP | 2801938 A1 | 11/2014 |

(Continued)

OTHER PUBLICATIONS

PCT/US2022/053719 Invitation to Pay Additional Fees mailed Apr. 26, 2023.

Primary Examiner — Myron Wyche
(74) Attorney, Agent, or Firm — Fletcher Yoder, P.C.

(57) ABSTRACT

Efficient two-way communications using broadband cellular technology is provided by adapting cellular components for end-to-end Internet Protocol (IP) addressable traffic. In this manner, the broadband cellular system may be efficiently transfer data over a flat network architecture using end-to-end IP traffic, bypassing features such as network address translation (NAT), tunnelling, and other LTE cellular carrier features.

17 Claims, 2 Drawing Sheets

(56) References Cited

U.S. PATENT DOCUMENTS

| | | | |
|---|---|---|---|
| 2019/0150134 A1* | 5/2019 | Kakinada | H04W 16/14 |
| | | | 370/330 |
| 2020/0053390 A1* | 2/2020 | Han | H04N 23/661 |
| 2022/0030593 A1* | 1/2022 | Yerramalli | H04W 72/0453 |
| 2022/0116763 A1* | 4/2022 | Bouskila | H04W 8/183 |
| 2022/0286425 A1* | 9/2022 | Yang | H04L 61/2575 |

FOREIGN PATENT DOCUMENTS

| | | | | |
|---|---|---|---|---|
| EP | 3454212 B1 | 3/2019 | | |
| WO | 2005022280 A1 | 3/2005 | | |
| WO | WO2017139596 | * | 8/2017 | G06T 5/50 |
| WO | 2020248963 A1 | 12/2020 | | |

* cited by examiner

BI-DIRECTIONAL CBRS COMMUNICATIONS SYSTEM AND METHODS

CROSS REFERENCE TO RELATED APPLICATIONS

This application claims priority to and the benefit of U.S. Provisional Application No. 63/292,718, entitled "BI-DIRECTIONAL CBRS COMMUNICATIONS SYSTEMS AND METHODS," filed Dec. 22, 2021, which is hereby incorporated by reference in its entirety for all purposes.

BACKGROUND

The present disclosure relates generally to efficient communications systems. In particular, the current disclosure relates to low-latency, high-bandwidth, bi-directional communications facilitated via use of Citizens Broadband Radio Service (CBRS), a form of private long-term evolution (LTE) communication that operates in the LTE spectrum of 450 MHz-3.8 GHz (e.g., in the 3.5 GHz frequency band).

As information technology (IT) becomes increasingly sophisticated, new applications of technology may be relied upon to invoke enhanced operational experiences across an environment. Traditional IT infrastructure has utilized independent/isolated networks to perform isolated tasks. This may be particularly true for security and/or safety tasks, which are oftentimes highly prioritized and isolated from peripheral tasks, to ensure no interference of the security and/or safety tasks by the peripheral tasks. Further, in many cases, these security and/or safety tasks may be implemented over a physical rather than wireless connection to ensure reliability and/or to meet network requirements (e.g., threshold maximum latency requirements, etc.). Unfortunately, however, the use of isolated networks and/or physical rather than wireless connections may provide significant complexity to the IT infrastructure that can result in costly infrastructure spend and sustaining costs. Additionally, by limiting certain networks to wired connections, flexibility in re-arranging components within an environment may be hindered. Further, the use of traditional Wi-Fi networks (e.g., over a 2.4 Ghz range) may be undesirable for safety systems, as many electronic devices may operate on similar frequencies, causing interference and reducing reliability. Further, Wi-Fi networks may cause variable latency for moving components (e.g., ride vehicles), as handoffs between Wi-Fi access points may be complex and latency intensive.

These constraints may be particularly hindering in large and/or dynamically changing environments, such as amusement parks. In these environments, attractions may span significant distances and/or may be continuously changing to increase user experience. Accordingly, new techniques are desired that allow for increased network functionality over a wireless network.

BRIEF DESCRIPTION

The systems and techniques described herein provide for enhancements (e.g., reduced latency and reliable two-way communications) to wireless networking communications. This may be useful for meeting constraints of certain systems (e.g., a threshold maximum latency requirement), while allowing for reliable two-way wireless communications between devices on the network. While the discussion provided herein relates primarily to amusement parks, this is in no way intended to limit the scope to such environments. Indeed, the systems and techniques provided herein could be used in a number of environments, including Enterprise IT environments, home network environments, etc. For example, a number of environments use PLC safety systems, such as manufacturing plants, oil rigs, blast furnace environments, or other environments where safety control may be desired. While the current techniques will be described with respect to CBRS, these techniques may be applied to other broadband cellular technologies (e.g., the fifth generation technology standard for broadband cellular networks (5G)).

In particular, efficient two-way communications are provided by adapting the CBRS system components for end-to-end Internet Protocol (IP) addressable traffic. In this manner, the CBRS system may be stripped of inefficient features of LTE that are unnecessary for end-to-end IP traffic, such as network address translation (NAT), tunnelling, and other LTE cellular carrier features.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The current techniques relate to using a secure bi-directional communication using Citizens Broadband Radio Service (CBRS) (Private Long-Term Evolution (LTE) band 48 Mhz-3.5 Ghz). Specifically, a modified LTE network provides a reliable bi-directional communication between programmable logic controllers (PLCs) that operate under safety protocols (e.g., common industrial protocol (CIP)) that include communications requirements that may not typically be met by traditional wireless communication networks. The PLCs may be considered safety devices and they are typically used with volatile/high-risk devices where lack of instantaneous response could be dangerous. These devices provide a safety measure, by looking for expected states of the volatile/high-risk devices and causing a safety control action when such expected status is not found (e.g., a fault state occurs).

The Broadband Cellular Network Infrastructure/Safety System Application

Figure 1:
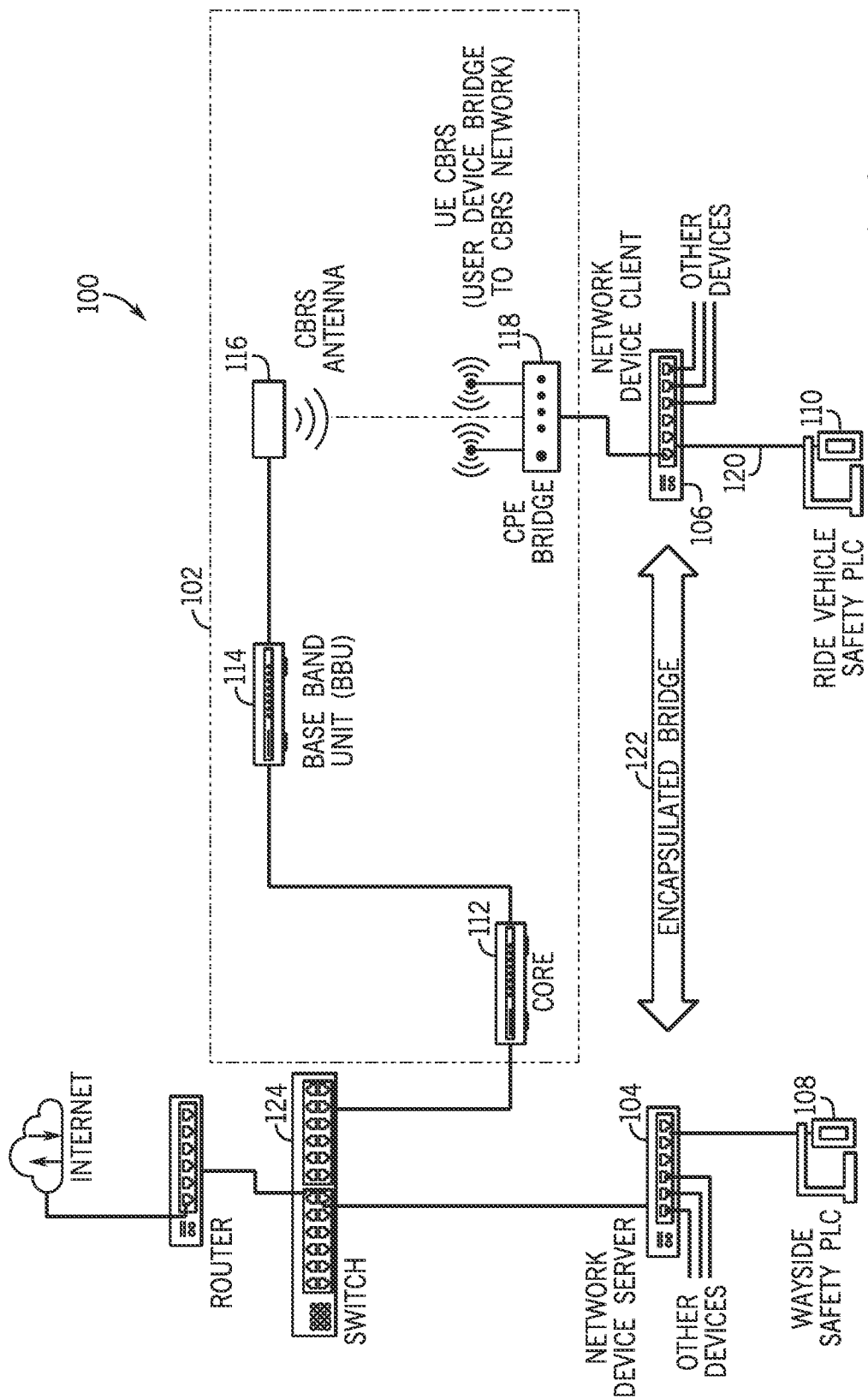
FIG. 1 is a schematic diagram, illustrating an Information Technology (IT) environment that utilizes an efficient bi-directional CBRS system to facilitate programmable logic controller (PLC) security between a server and a remote wireless client, in accordance with certain embodiments.

With all of this in mind, FIG. 1 is a schematic diagram, illustrating an Information Technology (IT) environment 100 that utilizes an efficient bi-directional CBRS system 102 to facilitate program logic controller (PLC) security between a server 104 and a remote wireless client 106 (e.g., a ride vehicle of an amusement at an amusement park), in accordance with certain embodiments.

The server 104 and the remote wireless client 106 may each be associated with a safety PLC (e.g., wayside safety PLC 108 and ride vehicle safety PLC 110, respectively). The wayside safety PLC 108 and ride vehicle safety PLC 110 are each tasked with providing heartbeat signals to one another to verify that near-instantaneous communication is present between the PLCs. The wayside safety PLC 108 is responsible for triggering a fault state if a requisite number of heartbeat signals are not received from the ride vehicle safety PLC 110 within a prescribed amount of time. Further, the ride vehicle safety PLC 110 is responsible for triggering a fault state if a requisite number of heartbeat signals are not received from the wayside safety PLC 108 within a prescribed amount of time. In this manner, a fault state can be triggered if either the wayside safety PLC 108 does not receive communication from the ride vehicle safety PLC 110 or vice versa. This is useful to ensure safe and effective control of systems, when necessary.

In one example, the PLC heartbeat scheme may be facilitated by a safety system (e.g., CIP Safety™) that has specific requirements that are not met using traditional private LTE networks. CIP Safety™ is an application layer service that provides high integrity safety services and diagnostics for communications between nodes on a network. To provide safety integrity, the safety system may require a minimum number (e.g., three) heartbeat signals to be received over a span of time (e.g., every 100 milliseconds) between PLCs. These heartbeat signals may be sent at periodic intervals (e.g., every 30 milliseconds). Accordingly, as may be appreciated, the latency requirement for these heartbeat signals is quite stringent, as missing even one heartbeat may cause a safety fault. This latency requirement along with the need for bi-directional communication between the PLCs has resulted in a need for enhancements to LTE communications, as traditional LTE networks may not satisfy these latency requirements and bi-directional communication is atypical for LTE networks. Indeed, typical LTE cellular communications at a 3.5 GHz frequency includes a fixed latency in downstream communications of approximately 20-30 milliseconds and a fixed latency in upstream communications of 30-50 milliseconds. Accordingly, because the upstream communications have a fixed latency close to the periodic interval of heartbeat signal transmission, the traditional fixed latency of the LTE networks may almost certainly cause heartbeat signals to be lost, thus not meeting the three heartbeat signals every 100 millisecond requirement of the safety system.

Further, traditional LTE networks do not provide network layer addressability (e.g., via IP address), which may be a requirement for provision of heartbeat signals between a server-side PLC (e.g., a PLC in a server environment) and a ride vehicle PLC (e.g., attached to a control of the ride vehicle of an amusement ride).

To provide reduced latency that may meet the maximum latency requirements of the safety system and to provide bi-directional communication, the LTE components of the CBRS system 102 may be stripped of unnecessary components for PLC-to-PLC communication. Typical LTE deployments include functionality for cellular carriers to facilitate cellular phone service. These LTE deployments come with applications for implementing many cellular carrier service features, such as billing, authorization, and authentication features, each of which may add to the fixed latency of the LTE network. Further, many security services necessary for cellular phone service providers may not be necessary for end-to-end IP-based communication (e.g., from one PLC to another PLC), as a requirement for a SIM card to access the LTE network may already be more secure than traditional network communications that merely require a password (e.g., Wi-Fi). Accordingly, to reduce the fixed latency, these features may be removed, leaving only the base functions needed to facilitate the LTE communications, stripping out all tunnelling and network address translation (NAT), and utilizing a flat network architecture still capable of running over LTE. Indeed, the NAT and tunnelling has been found to be latency intensive. NAT is a method of mapping an IP address space into another by modifying network address information in the IP header of packets while they are in transit. This feature is quite latency intensive and is not necessary for end-to-end IP transmission. Further, traditional LTE may include a system-to-system tunnel that is not required for end-to-end IP communication and that is established on a time out, where, after a given time period (e.g., every 3 hours), the tunnel is torn down and re-built. This re-build process can take up to 1.5 seconds, which intrinsically breaks the continuous stream of heartbeat signals, causing a fault state between the PLCs. Accordingly, a new broadband cellular technology system is described herein that utilizes tunnelless communication independent of network address translation (NAT), resulting in a reduced latency of communication, when compared to traditional broadband cellular technologies where tunnelled communication with network address transation are used. In this manner, the new broadband cellular technology system can be used to ensure the latency of communication does not impact latency-dependent features, such as the ability of a threshold number of the heartbeat signals to be received by a receiving PLC, as described in detail herein.

For example, the CBRS system 102 may include a core 112, a base band unit (BBU) 114, and a radio unit/CBRS antenna 116 (e.g., an indoor radio unit (IRU)/antenna). The BBU 114 is responsible for facilitating communication between the core 112 and the radio unit/CBRS antenna(s) 116 that wirelessly transmits/receives signals (e.g., the heartbeat signals from the wayside safety PLC 108 and/or the ride vehicle safety PLC 110). The ride vehicle safety PLC 110 may require a hardwired connection, which may be facilitated via a Customer Premise(s) Equipment (CPE) bridge 118 and hardwire connection 120 (e.g., via Ethernet wired components) connecting the CPE bridge 118 to the ride vehicle safety PLC 110. The CPE bridge 118 may convert signals (e.g., heartbeat signals) received from the hardwire connection 120 to a wireless signal that is transmitted to the radio unit/CBRS antenna 116. As mentioned above, the CBRS system 102 may utilize a flat end-to-end IP addressable communication, which enables the signal to be addressed to the wayside safety PLC 108 via an IP address of the wayside safety PLC 108. The core 112 and BBU 114 may be modified to remove all NAT and tunnelling, instead relying on IP-based addressing without NAT. In this manner, the latency in providing the signals from the ride vehicle safety PLC 110 to the wayside safety PLC 108 may be greatly reduced, enabling the signals to reach the wayside safety PLC 108 within the prescribed requirements set by the safety system. In some embodiments, an encapsulated bridge 122 may be formed between the server 104 and the client 106, by deploying a virtual network protocol (e.g., Open VPN) on both of these devices. As may be appreciated, this may facilitate the bi-directional communication across the cellular network. Further, by design, virtual private networks add an extra layer of security to the network communications.

As mentioned above, a requirement for the safety system is that the PLCs must be able to see and establish a dedicated connection to one another. For two PLCs (e.g., the wayside safety PLC 108 and the ride vehicle safety PLC 110), the first PLC (e.g., the ride vehicle safety PLC 110) communicates heartbeat signals to the second PLC (e.g., the wayside safety PLC 108) and the second PLC (e.g., the wayside safety PLC 108) communicates heartbeat signals to the first PLC (e.g., the ride vehicle safety PLC 110). If either PLC does not receive the requisite number of heartbeat signals within a prescribed amount of time, a fault state is triggered by the receiver that was expecting but did not receive all of the heartbeat signals. Accordingly, the PLCs should be connected in bi-directional communication. This provides an inherent complexity when dealing with CBRS networks, as these private LTE networks are natively uni-directional, not providing support for bi-directional communication between a server (e.g., the wayside safety PLC 108) and a client (e.g., the ride vehicle safety PLC 110). Accordingly, to enable bi-directional communication over CBRS/private LTE, a route is added to allow IP traffic to go back to an originating client PLC (e.g., the ride vehicle safety PLC 110). This route may be added by updating routing tables to provide a reverse route, describing the components that may be traversed to reach the client PLC (e.g., the ride vehicle safety PLC 110) from the server PLC (e.g., the wayside safety PLC 108). In this manner, the wayside safety PLC 108, when it becomes aware of the IP address of the ride vehicle safety PLC 110 (e.g., via reception of a heartbeat signal sourced from the ride vehicle safety PLC 110 that includes an indication of the source IP) may address its heartbeat signals to the ride vehicle safety PLC 110 via the IP address of the ride vehicle safety PLC 110. Thus, a switch 124 may steer communication from the wayside safety PLC 108 that is addressed to the ride vehicle safety PLC 110 to the CBRS system 102 that may be tasked with providing signals from the wayside safety PLC 108 to the ride vehicle safety PLC 110, as indicated by the reverse path routing table entries. Thus, bi-directional communication between the ride vehicle safety PLC 110 and the wayside safety PLC 108 may be facilitated.

The Roaming Robot Application

Figure 2:
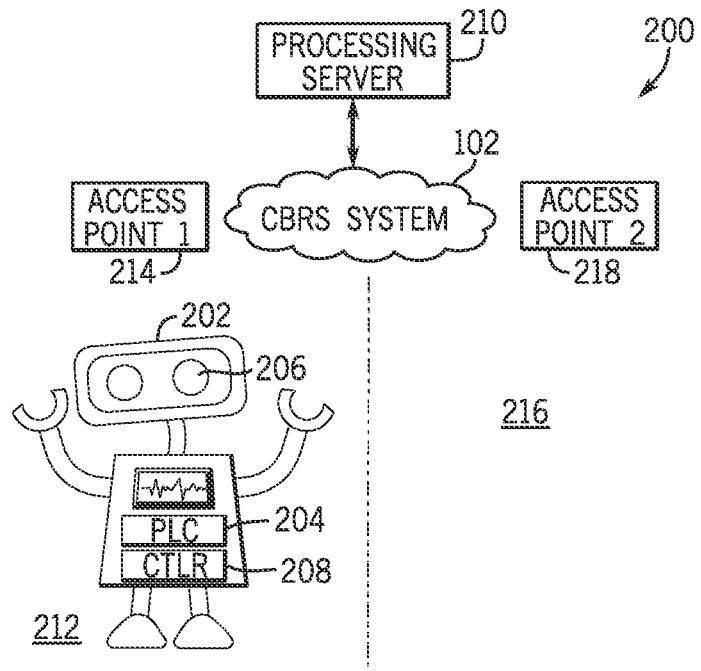
FIG. 2 is a schematic illustration of a roaming robot that may make use of the CBRS network described herein, in accordance with certain embodiments.

While FIG. 1 has primarily described a safety PLC application of the low-latency, bi-directional CBRS network, there may be many other applications that could make use of such a low-latency, bi-directional CBRS network. For example, FIG. 2 provides a schematic illustration of a roaming robot system 200 that may make use of the CBRS system 102 described herein, in accordance with certain embodiments. In the case of roaming robotics, a low-latency, bi-directional CBRS network could provide a host of benefits for facilitating functionality of a robot 202. For example, as above, the robot 202 could be equipped with a safety PLC 204, allowing the robot to be controlled via a PLC safety system. Further, the CBRS network provides a relatively high-bandwidth operation, which may be useful in facilitating computer vision processing and/or autonomous action processing between sensors 206 (e.g., cameras) of the robot 202 and a processing server 210 tasked with processing the inputs of the sensors. As may be appreciated, each set of tasks may require bi-directional, low-latency communications, which can be facilitated by the CBRS network provided herein. As the inputs are received by the server 210, the server 210 may provide control commands to a controller 208 of the robot 202 (e.g., based upon the computer vision processing and/or autonomous action processing).

Additionally, because the robot 202 may be roaming within an area, communications between the robot 202 and the server 210 may, from time to time, require a transition between an access point connecting the robot 202 to the server 210. For example, as a robot 202 transitions from a first region 212 of an environment served by a first access point 214 to a second region 216 of an environment serviced by a second access point 218, a communications handoff to the second access point 218 may be required. The CBRS system 102 has been shown to have relatively lower-latency access point handoff, when compared to Wi-Fi access point transition.

Edge-Based Deployment of Interactives Processing

Figure 3:
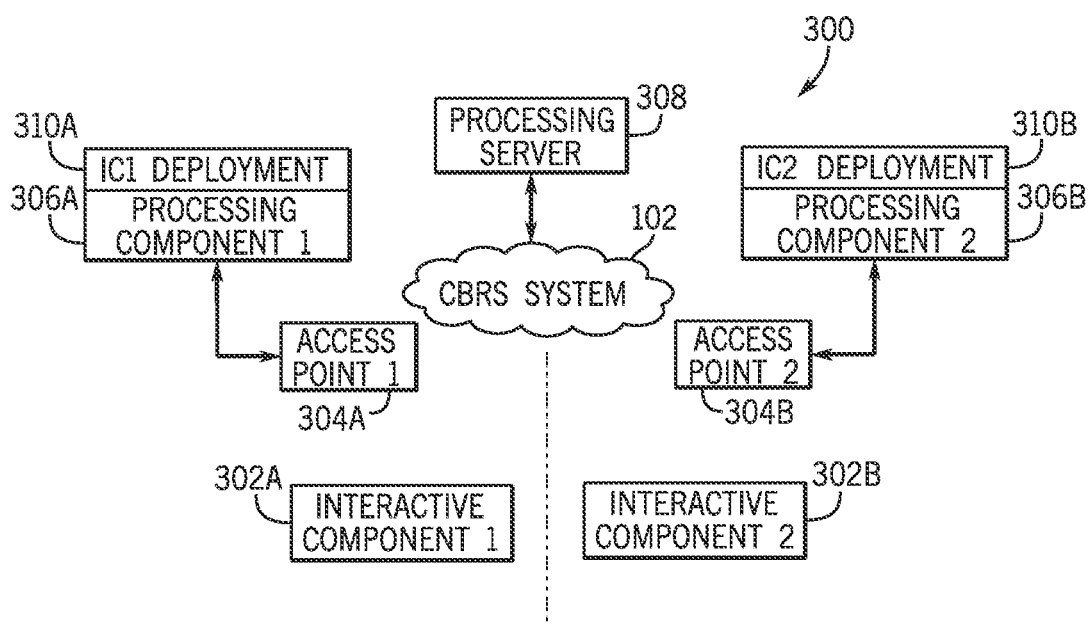
FIG. 3 is a schematic illustration of a system where temporary interactive components use the CBRS system, in accordance with certain embodiments.

The benefit of a low-latency handoff between access points may be useful for other applications as well. For example, in the case of an amusement park, portable or temporary interactive components may be set up within the park to provide a dynamic user experience within the park. FIG. 3 provides an illustration of a system 300 where temporary interactive components 302A and 302 B use the CBRS system 102, in accordance with certain embodiments. CBRS enables a large number of antennas and access points using a single compute platform. Thus, the CBRS system 102 described herein can facilitate edge computing by efficiently deploying compute processing of portable and/or temporary interactive components to processing components nearest to an access point that the interactive component is connected to. For example, as illustrated in FIG. 3, Interactive Component 1 302A is closest to Access Point 1 304A. Processing Component 1 306A is the closest processing component to Access Point 1 304A and, thus, may be tasked with processing interactions with Interactive Component 1 302A. To do this, upon identifying Access Point 1 304A as the access point that Interactive Component 1 302A is connected to, the CBRS system 102 and/or Processing Server 308 may provide an Interactive Component 1 Deployment 310A to Processing Component 1 306A. The Interactive Component 1 Deployment 310A provides computer-readable instructions that enable the Processing Component 1 306A to process inputs received from Interactive Component 1 302A (e.g., via Access Point 1 304A), thus providing efficient localized processing without hops (e.g., packet transmission via one or more network segments) back to the processing server 308.

In a similar manner, Interactive Component 2 302B is closest to Access Point 2 304B. Processing Component 2 306B is the closest processing component to Access Point 2 304B and, thus, may be tasked with processing interactions with Interactive Component 2 302B. To do this, upon identifying Access Point 2 304B as the access point that Interactive Component 2 302B is connected to, the CBRS system 102 and/or Processing Server 308 may provide an Interactive Component 2 Deployment 310B to Processing Component 2 306B. The Interactive Component 1 Deployment 310B provides computer-readable instructions that enable the Processing Component 2 306B to process inputs received from Interactive Component 2 302B (e.g., via Access Point 2 304B), thus providing efficient localized processing without hops back to the processing server 308.

As may be appreciated, this may greatly reduce latency of processing interactive inputs provided at the interactive components. This may provide faster responsiveness, as the processing components may provide control signals back to the interactive components based upon the results of deployment processing.

Multi-Application on a Common Network Infrastructure

Another feature of the CBRS system 102 described herein is that multiple applications may be facilitated via a common network infrastructure. For example, in an amusement park environment, the safety system may be facilitated in parallel with a high-bandwidth streaming content delivery service (e.g., presented via a headset enabled to communicate over the CBRS system 102 and/or an independent module equipped to communicate over the CBRS system 102 that causes rendering of the content on a headset) and/or a high-bandwidth analytics tracking service, which was not feasible with prior systems. Indeed, as mentioned above, prior to the current system, network infrastructure was either high-bandwidth with relatively higher latency, such that it could support high-bandwidth applications, but not safety systems or was relatively low-latency, but relatively lower-bandwidth and/or provided higher latency in transitioning from access point to access point. This is not the case with the current system. Indeed, the CBRS system 102 described herein is relatively low-latency and relatively high-bandwidth, allowing for multiple applications to exist on a common network infrastructure. This can greatly reduce costs in creating and maintaining the network infrastructure, as dedicated network infrastructures for different applications are not necessary, reducing implementation and sustaining efforts.

As will be described in more detail below, CBRS enables slicing/segmenting of the available spectrum for different tasks. Accordingly, though different applications may be facilitated by a common network infrastructure, each application or subset of applications could be assigned a particular slice of the spectrum with which it is allowed to communicate. In this manner, safety applications could be on a separate slice of the spectrum than content streaming services, ensuring that there is no interference between these applications and that there is no unauthorized/undesired access to particular applications.

Reliable Communication Via Interference Reduction and Parallel Redundancy

Furthermore, by communicating on the 3.5 Ghz frequency band, far less interference may be experienced, when compared to traditional network infrastructures. For example, in amusement parks, large crowds of users may be present, many of whom carry their own personal electronic devices that access Wi-Fi networks. These multitude of devices can cause interference with other devices utilizing the Wi-Fi frequency band (e.g., via a fluid mesh network), which may result in a less reliable network experience.

To further increase reliability of communications of the CBRS system 102, the Parallel Redundancy Protocol (PRP) could be implemented in the CBRS system 102. The PRP could provide two signals in parallel to a target (e.g., a PLC) via two different routes in the system. So long as one of the signals reaches the PLC, the data reaches the target, which, in the case of PLCs, would result in refraining from triggering a fault state.

Access Authentication and Authorization

Authentication and authorization enhancements may also be provided by the CBRS system 102. For example, in contrast to traditional Wi-Fi networks, which may merely require identification of a network service set identifier (SSID) and associated password, the CBRS system 102 may authenticate and authorize electronic devices to access certain portions of the network based upon the presence of a particularly configured subscriber identification module (SIM) card within the electronic device, which in some cases may be an eSim card embedded in the electronic device that is configured via an eSim profile or a traditional SIM card that is a physical card configured for access to the network. In this manner, access to the network of the CBRS system 102 may be more tightly controlled than a traditional Wi-Fi network, enabling enhanced security, which may be particularly useful for safety systems or bi-directional systems.

The SIM card (or the eSim profile) may be configured with an international mobile subscriber identity (IMSI), which may be a unique identifier associated with the SIM card. The IMSIs of authorized SIM cards/eSIM profiles may be registered by a network administrator, indicating particular portions of the network that may be accessed (e.g., receive data and/or transmit data) by an electronic device associated with the SIM card/eSIM profile.

The SIM card/eSIM may be used to communicate with a cloud-based Serial Attached Small Computer System Interface (SAS), which results in assigning Internet Protocols (IPs) to the sim card as well as authenticates the device as being valid and authorized on the network. This provides an additional level of security and authentication by isolating the certain features (e.g., ride safety systems and/or show networks within attractions) from the main private cellular network accessible by guests.

Sub-Band Slicing for Dedicated Communications

As mentioned above, CBRS enables slicing/segmenting of the available spectrum for different tasks. Accordingly, though different applications may be facilitated by a common network infrastructure, each application or subsets of applications could be assigned a particular slice of the spectrum with which it is allowed to communicate. In this manner, safety applications could be assigned a separate slice of the spectrum than content streaming services, ensuring that there is no interference between these applications and that there is no unauthorized/undesired access to particular applications. Because the IMSI registration defines particular portions of the spectrum that the electronic device is allowed to access, a robust security implementation may be instituted. Because there is a particular interest in protecting the safety systems, a slice dedicated to these systems could be assigned and the PLCs that perform the safety system functions could each be associated with a SIM card/eSIM profile that has an IMSI associated with access to that slice.

The slices can be split in a number of different ranges. For example, if the available spectrum is 100 Mhz, this could be split as 10 10 Mhz slices, 2 50 Mhz slices, or 2 25 Mhz slices and 1 50 Mhz slice. In this manner, the slicing can cater to bandwidth needs on the network. For example, the safety system may not require significant bandwidth if it is merely providing heartbeat signals across the network. Accordingly, the safety system slice may be quite small relative to a high-bandwidth application, such as streaming content transmission. Thus, different sized slicing may be provided for different bandwidth applications, while ensuring that these different applications exist in different frequency bands, thus, not interfering with one another.

Slicing may provide a number of implementation benefits. In one embodiment, a dedicated slice (e.g., 50 Mhz in size) may be allocated for an exclusive guest network. A guest could scan a QR code that allows them to pay for access to the guest network. In exchange for payment, an eSIM profile could be provided to the guest's electronic device, enabling access to the dedicated slice allocated for the exclusive guest network.

Slicing can be used for capacity planning as well. In contrast to Wi-Fi, where any number of devices can connect based upon a known password, CBRS can be used to enable only particular SIM/eSIM card equipped devices to access the network slice. If a dedicated premium fast network can handle a maximum threshold of guests, as an increasing number of electronic devices access this network slice, variable pricing increases may be requested for subsequent electronic devices to access the network slice, as supply is diminishing and demand is increasing.

CBRS also allows for limiting access to particular slices of the network based upon a current location of the electronic device. In an amusement park example, it may be desirable to provide exclusive streaming content associated with an amusement to a user only when the user is in the vicinity of the amusement. CBRS may provide this type of functionality in a number of different manners. In one embodiment, to perform this location-based limitation, the SIM cards may be allowed access to particular slices only from certain access points that are in the vicinity of the amusement. In this manner, only electronic devices accessing the network via the access point in the vicinity of the amusement will receive access to streaming content provided via the restricted slice.

In one embodiment, as a guest accesses the network of the CBRS system 102, domain name system (DNS) entries may be utilized to redirect uniform resource locators (URLs) from an external network resource to a local content delivery network, enabling certain content to be provided by the local network rather than an outside resource. In this manner, content may be served up in a more efficient manner and may reduce bandwidth to outside resources.

The CBRS system 102 may also provide peer-to-peer capabilities amongst devices on the network. For example, SIM/eSIM equipped interactive devices could communicate with one another over the bi-directional CBRS network. Further, subsets of devices could be assigned a particular slice of the network, enabling secure peer-to-peer communications between the devices in the subset of devices.

Broadband Cellular System Use Cases

Any number of different types of electronic devices may make use of the network of the CBRS system 102 described herein. For example, NFC devices, such as electronic wearables could interact with 5G networking functionality via a connection to the network. Other devices, such as an interactive wand, headset, or intermediate module connecting to a headset, or other device can be a client device on the network.

Another example use case for the CBRS system is a wireless camera system that provides streaming video over the CBRS system 102. A wireless camera can be mounted to a ride vehicle and battery and may capture video of the ride vehicle and provide low-latency data back to a server 104 in a similar manner to the ride vehicle safety PLC 110. Because the CBRS system 102 provides a relatively high-bandwidth upload, the wireless upload of the ride vehicle may be quite efficient and high quality.

The camera could also be used in other environments. For example, construction environments where hard-wired cameras may be difficult to place or may be susceptible to damage from equipment (e.g., backhoes, etc.).

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a client device;
a server device; and
a broadband cellular technology system configured to provide bi-directional cellular communication between the client device and the server device via end-to-end Internet Protocol traffic, wherein the broadband cellular technology system comprises a Citizens Broadband Radio Service (CBRS) system that provides the end-to-end Internet Protocol traffic by bypassing network address translation (NAT) and tunnelling of a Long-Term Evolution (LTE) standard for wireless broadband communication for mobile devices.

2. The system of claim 1, wherein the client device comprises a first programmable logic controller (PLC) and the server device comprises a second PLC.

3. The system of claim 2, wherein the first PLC and second PLC are configured to provide, via the bi-directional cellular communication, heartbeat signals indicating active communication between the first PLC and the second PLC.

4. The system of claim 3, wherein:
the first PLC is configured to trigger a fault state when a threshold number of the heartbeat signals are not received within a prescribed amount of time from the second PLC; and
the second PLC is configured to trigger the fault state when the threshold number of the heartbeat signals are not received within the prescribed amount of time from the first PLC.

5. A system, comprising:
a client device comprising a first programmable logic controller (PLC);
a server device comprising a second PLC; and
a broadband cellular technology system configured to provide bi-directional cellular communication between the client device and the server device via end-to-end Internet Protocol traffic;
wherein the first PLC and second PLC are configured to provide, via the bi-directional cellular communication, heartbeat signals indicating active communication between the first PLC and the second PLC;
wherein the first PLC is configured to trigger a fault state when a threshold number of the heartbeat signals are not received within a prescribed amount of time from the second PLC; and the second PLC is configured to trigger the fault state when the threshold number of the heartbeat signals are not received within the prescribed amount of time from the first PLC; and
wherein the broadband cellular technology system is configured to utilize tunnelless communication without network address translation, reducing a latency of communication between the first PLC and the second PLC over tunnelled communication with network address translation to ensure the latency of communication does not impact the ability of the threshold number of the heartbeat signals to be received by a receiving PLC.

6. A system, comprising:
a client device comprising a first programmable logic controller (PLC);
a server device comprising a second PLC; and a broadband cellular technology system configured to provide bi-directional cellular communication between the client device and the server device via end-to-end Internet Protocol traffic;
wherein the first PLC is associated with a ride vehicle of an amusement park attraction.

7. A system, comprising:
a client device;
a server device; and
a broadband cellular technology system configured to provide bi-directional cellular communication between the client device and the server device via end-to-end Internet Protocol traffic, wherein the broadband cellular technology system comprises a Citizens Broadband Radio Service (CBRS) system, wherein the CBRS system comprises:
a core;
a CBRS antenna;
a base band unit configured for facilitating communication between the core and the CBRS antenna; and
a Customer Premise(s) Equipment (CPE) bridge coupled via a hardwire connection to the client device, to provide a hardware network connection to the client device, wherein the CPE bridge is configured to transform wireless signals received from the CBRS antenna to a hardwire signal transmitted via the hardwire connection to the client device.

8. The system of claim 1, comprising routing tables that store a reverse routing path from the server device to the client device, to facilitate the bi-directional cellular communication.

9. The system of claim 1, comprising:
a SIM card, eSIM card configured with an eSIM profile, or both, wherein authentication and access to the bi-directional cellular communication is provided via an international mobile subscriber identity (IMSI) of the SIM card, the eSIM profile, or both.

10. The system of claim 1, wherein the broadband cellular technology system is configured to segment an available frequency band for the bi-directional cellular communication into a plurality of sub-bands, wherein each application of a plurality of applications is assigned to a particular sub-band of the plurality of sub-bands, to isolate applications in different sub-bands.

11. A system, comprising:
a client device;
a server device; and
a broadband cellular technology system configured to:
provide bi-directional cellular communication between the client device and the server device via end-to-end Internet Protocol traffic; and
segment an available frequency band for the bi-directional cellular communication into a plurality of sub-bands, wherein each application of a plurality of applications is assigned to a particular sub-band of the plurality of sub-bands, to isolate applications in different sub-bands;
wherein one application of the plurality of applications comprises: at least one of:
a safety system that is isolated in a dedicated sub-band for safety system traffic; or
a prioritized guest network that is isolated in a dedicated sub-band for faster bi-directional cellular communication traffic.

12. The system of claim 11, wherein the client device is configured to:
access the prioritized guest network via a graphical user interface display in response to scanning a quick response (QR) code;
in response to interacting with the graphical user interface display, receive an eSIM profile that comprises an international mobile subscriber identity (IMSI) registered for access to the dedicated sub-band for faster bi-directional cellular communication traffic; and
access the dedicated sub-band for faster bi-directional cellular communication traffic, using the IMSI.

13. The system of claim 1, wherein the client device comprises a camera equipped to capture and stream video content via the bi-directional cellular communication.

14. The system of claim 13, wherein the camera comprises a mobile camera attached to a ride vehicle of an amusement park attraction.

15. A system, comprising:
a client device;
a server device; and
a broadband cellular technology system configured to provide bi-directional cellular communication between the client device and the server device via end-to-end Internet Protocol traffic;
wherein the client device comprises a roaming robot, comprising: sensors, a safety programmable logic controller (PLC), and a controller;
wherein the roaming robot is configured to:
transfer between access points as it roams into regions served by different access points;
cause performance of computer vision processing, by providing sensor inputs to a computer vision processing server via the bi-directional cellular communication;
cause safety control by providing heartbeat signals to a server PLC via the bi-directional cellular communication; or
any combination thereof.

16. A system, comprising:
a client device;
a server device; and
a broadband cellular technology system configured to provide bi-directional cellular communication between the client device and the server device via end-to-end Internet Protocol traffic;
wherein the client device comprises an interactive component configured to receive inputs to be processed by an external processing system;
wherein the broadband cellular technology system is configured to:
identify an access point that the interactive component is connected to;
identify a processing component nearest to the access point that is equipped to process the inputs received by the interactive component; and
deploy instructions to complete processing of the inputs to the processing component to cause the processing component to process the inputs.

17. A system, comprising:
a client device;
a server device; and
a broadband cellular technology system configured to provide bi-directional cellular communication between the client device and the server device via end-to-end Internet Protocol traffic;
wherein the broadband cellular technology system is configured to form an encapsulated bridge between the server device and the client device via a virtual network protocol, facilitating the bi-directional cellular communication.

\* \* \* \* \*